Aug. 7, 1934.  A. M. HANSEN  1,969,173
DUMPING VEHICLE
Filed Feb. 28, 1933   3 Sheets-Sheet 1

Inventor
ALBERT M. HANSEN
By Samuel H. Davis
Attorney

Aug. 7, 1934.  A. M. HANSEN  1,969,173
DUMPING VEHICLE
Filed Feb. 28, 1933  3 Sheets-Sheet 2
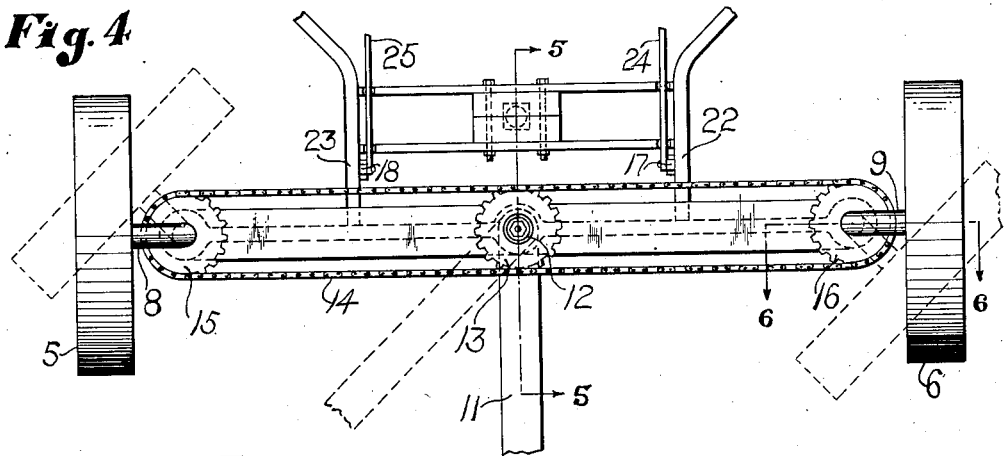
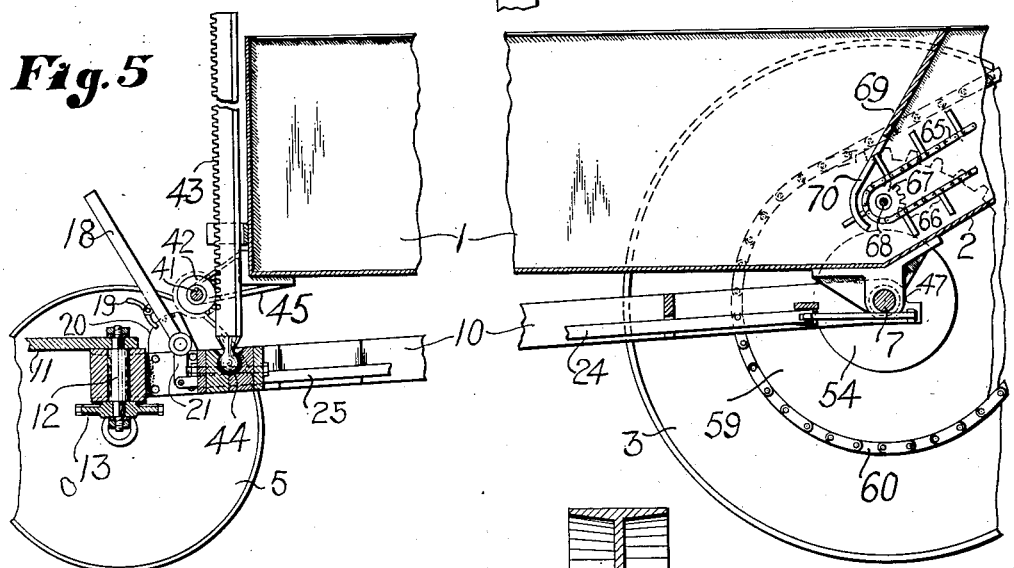
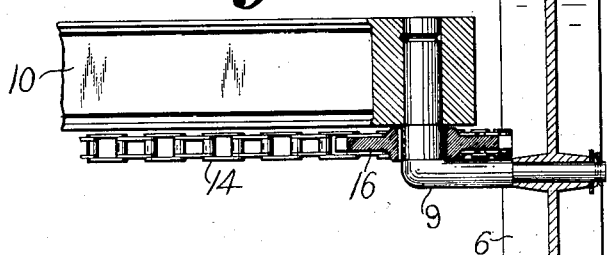
Inventor
Albert M. Hansen
By
Samuel H. Davis.
Attorney Aug. 7, 1934.  A. M. HANSEN  1,969,173
DUMPING VEHICLE
Filed Feb. 28, 1933  3 Sheets-Sheet 3

Inventor
ALBERT M. HANSEN
By Samuel H. Davis.
Attorney

Patented Aug. 7, 1934

1,969,173

UNITED STATES PATENT OFFICE 1,969,173

DUMPING VEHICLE

Albert M. Hansen, Lansing, Mich.

Application February 28, 1933, Serial No. 658,991

2 Claims. (Cl. 298—20)

This invention relates to manure spreaders. More particularly it belongs to that class or type of wagons used on farms in which fertilizer may be transported and dumped and spread where and as desired. The invention comprises a body which may be water tight for hauling fluid or partly fluid material, and there is also included a scraping mechanism to assist in discharging the manure, and a beater or revolving breaker to separate the lumps of the substances being dumped.

The object of this invention is the production of a wagon for handling manure of the type mentioned, the vehicle being equipped with parts of special formation and disposition illustrated in the accompanying drawings, and believed to be especially efficient for the purpose intended.

Figure 1:
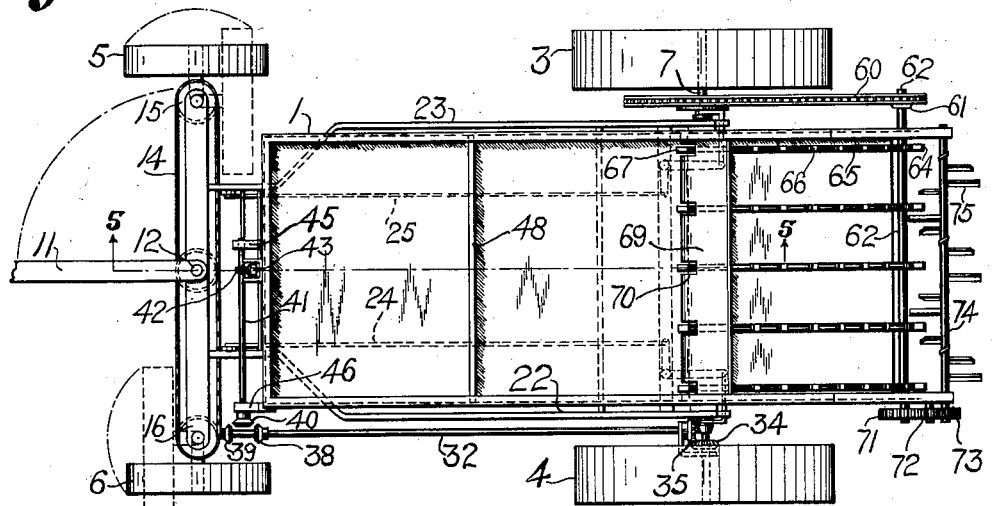
Figure 2:
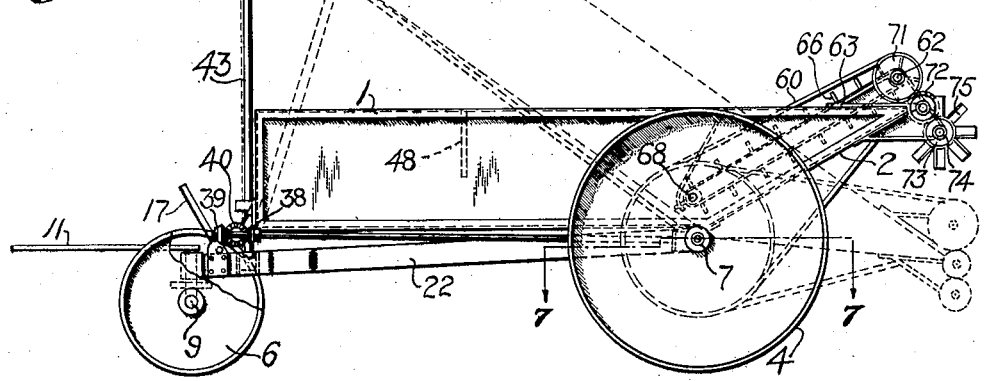
Figure 3:
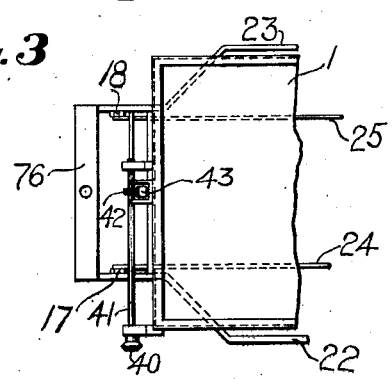
Figure 7:
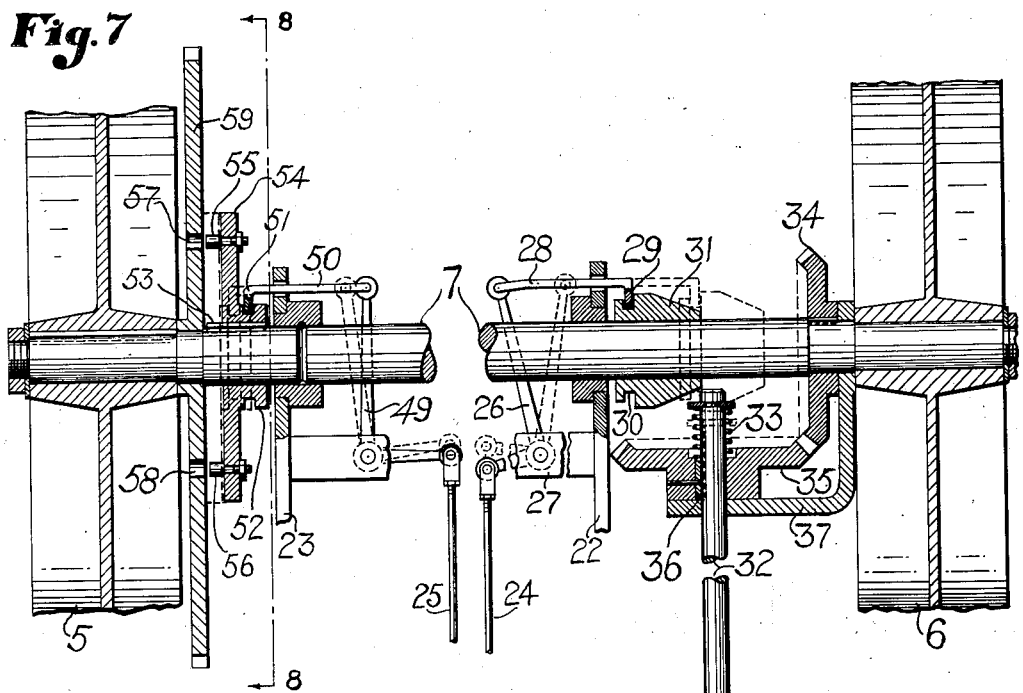
Figure 8:
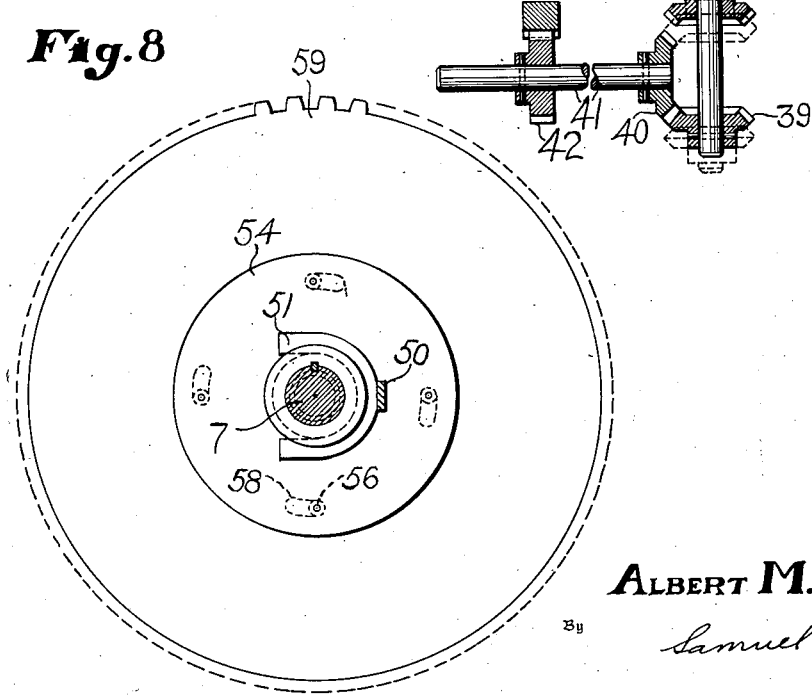

Of the drawings, Fig. 1 represents a top view of all parts assembled. Fig. 2 is a side view. Fig. 3 a fragmentary top view of the front end of the body and frame provided with a cross bar or drag for connecting the wagon with a tractor. Fig. 4 is a front top view showing the steering devices for the front wheels, and operating tongue or lever. Fig. 5 is a side view slightly enlarged showing the lifting pinion on the front of the body, the vertical rack bar engaged therewith, and one of the gear operating levers at the front. The slant of the body, and the scraper are shown at the rear in this view. Fig. 6 represents one of the front wheels in vertical section with the angular stub axle therefor, and the sprocket wheel and a portion of the sprocket chain thereon. Fig. 7 shows the rear or driving axle with the gear shift devices arranged towards one rear wheel, and the scraper clutch mechanism located towards the opposite rear wheel, together with the sprocket for driving the scraper mechanism. In this figure are also shown the gear wheels on the shifting and inclinable shaft, and also the pinion and rack bar engagement for raising the front end of the body in the dumping operation. Fig. 8 shows the sprocket wheel which drives the scraper mechanism, and the clutch devices therewith.

Throughout the drawings and description the same number is used to refer to the same part.

Considering the drawings, a body 1 of any chosen size or form is usually provided with an upwardly and rearwardly slanting back wall 2 to aid in discharging the manure when the body assumes the elevated position indicated by broken lines in Fig. 2. The body is supported upon rear wheels 3 and 4 and front wheels 5 and 6. The axle 7 for the rear wheels may be regarded as the driving axle. The front wheels are revoluble upon the stub axles 8 and 9 connected with a vehicle frame comprising side bars as hereinafter referred to and transverse members 10. At the front, as best shown in Fig. 4 there is provided a tongue or lever 11 and the tongue may be hitched to suitable draught animals by means of the customary cross trees, not shown, on the king bolt 12. The king bolt carries a sprocket wheel 13, and as the bolt is turned by the tongue the sprocket wheel actuates the chain 14 driving the sprockets 15 and 16 and consequently the stub axles 8 and 9 and turning the front wheels for steering purposes. It is not intended to limit this invention to the precise steering or draught means illustrated, and those elements may be obviously varied.

At the front end of the wagon, as best illustrated in Figs. 2 and 5 are arranged the levers 17 and 18 in the positions indicated by the reference numbers 17 and 18 in Fig. 4. Connected with those levers and extending parallel with the side bars 22 and 23 of the wagon frame and connected with crank arms such as the arm 21 shown in Fig. 5 with which the levers are provided, are gear and clutch operating rods 24 and 25 as best shown in Fig. 7. Rod 24 throws the bell crank lever 26 pivotally carried by the cross member 27 of the frame, and moves the link 28 having the bent end 29 in engagement with the encircling groove 30 of the conical slide 31 on axle 7. The slide may thus be moved towards or away from rear wheel 6, and it impresses a longitudinal movement upon the shaft 32. This shaft is capable of a movement lengthwise and a rotative movement, and it can assume an inclined position when the body is raised, as indicated by the broken lines in Fig. 2. For the purposes of this explanation the shaft is termed the inclinable shaft. As shown in Fig. 7, it will be noted that when the cone slide is withdrawn, a coil spring 33 on the shaft 32 acts against a collar or the like on the end of the shaft and returns the shaft to its former position. Driven by axle 7 is a mitre gear 34 in mesh with a like gear 35 which is provided with a key 36 sliding in a suitable key way extending lengthwise in the shaft 32. Gear 35 is carried against the bracket 37. As shaft 32 is moved longitudinally gears 38 and 39 are brought alternately into engagement with a pinion or mitre gear 40 on a transverse shaft 41 carrying the pinion 42 secured thereon and in engagement with the vertically disposed geared rack bar 43. The rack bar has a universal end joint 44 with the transverse members 10 of the frame as shown in Fig. 5. As the transverse shaft 41 is attached to the front end of the body by the bearing bracket 45, of which there is usually provided a fellow bracket 46 at the corner of the body as shown in Fig. 1, it is thought to be clear that the pinion will climb the rack bar and the front end of the body will be raised on the pivot 47 into the position indicated by the broken lines in Fig. 2, which is the dumping and spreading position of the body.

Again referring to Fig. 7, when the lever 18 by its crank arm 21 moves the rod 25 lengthwise, and bell crank lever 49 which has the link 50 with the hook end 51 entering the encircling groove of the sliding collar 52 which is movable on the axle 7 towards and from the wheel 5, it correspondingly moves the clutch disk. The slide 52 moves in engagement with a key 53 carried lengthwise by the axle 7 and the clutch disk may be moved thereby. The disk is marked 54 and it is provided with any number and disposition of roller pins 55 and 56 which as the disk 54 is rotated are caused to enter the holes 57 and 58 in the large sprocket 59 which is loose on the axle 7. As best shown in Figs. 1, 2 and 5 the sprocket 59 drives the chain 60 and revolves the smaller sprocket 61 on the cross shaft 62 above and at the rear of the body. The shaft 62 carries the sprocket wheels 64 spaced apart as shown in Fig. 1, and the shaft itself is supported in bearing brackets 63, as shown in Fig. 2. Engaging each sprocket wheel 64 is a chain 65 having projecting scraping and manure separating pins 66, and the chain passes around a sprocket wheel 67 on a transverse shaft 68 illustrated in Fig. 5. It will be noted in Figs. 1 and 2 that the body 1 has a baffle or partition plate 48 about midway between the position of the shaft 68 and the front end of the body, and in Fig. 5 is shown a second baffle 69 extending in an inclined direction over the shaft 68 and having as set out in Fig. 1 a number of spaced slots or recesses 70 through which pass the scraper pins 66 during their movement with the chains 65. The baffles prevent the surging and splashing if the material is in a fluid state. Both baffles terminate at a distance above the bottom of the body. The transverse end shaft 62 is provided at its end just outside the body with a gear 71 that meshes with an idler intermediate spur gear 72 and drives a like gear 73 on a rear transverse shaft 74. Shaft 74 is the beater shaft and is provided with a plurality of projecting beaters or blades 75 arranged to act upon the materials just as they are discharged from the slanting back wall 2 of the body.

Fig. 3 of the drawings represents the front end portion of the body having the same construction as described, but the side bars 22 and 23 are joined in front by the cross beam or bar 76. This bar is provided with one or more orifices as illustrated and may be employed to connect the wagon with a tractor if so desired.

The operation of this invention consists in drawing the wagon structure over the field or area upon which the manure is to be spread. If the material is in a fluid condition the actuation by lever 17 of rod 24 will effect the engagement of either of the gears 38 or 39 with the gear 40 on shaft 41. If the gear 38 be engaged with gear 40 as shown in Fig. 7 the lift gear 42 will climb the rack 43 and the front end of the body will rise. If gear 38 be engaged the body will be lowered to normal position. Should it be desired to draw the wagon about without operating the body hoisting members, the lever 17 is locked by means of the hand latch 19 and geared segment 20 in its intermediate position, and neither of the gears 38 or 39 will be engaged, the conical slide 31 holding both of those gears out of engagement. When the material is in a mass and must be distributed or broken up, the lever 18 and rod 25 are employed, and the scraping mechanism and beating devices are set in operation as will be readily understood. The movement of the scraper pins or projections 66 in the recesses 70 of the rear baffle 69 keeps the baffle clear and the contents of the body moving rearwardly. It will be understood that this invention is in no sense confined to the form of levers or to the holding means therefor as shown, those parts in various different shapes and relations being well known contrivances.

Having now described this invention and the manner of its use, I claim:—

1. In a dumping vehicle, the combination with a body, of front and rear wheels therefor, an axle for the rear wheels, said body having a pivotal connection with the rear axle, frame members comprising side bars and transverse members extending between the front wheels, a longitudinally and rotatively movable inclinable shaft, gearing for rotating the said shaft by the rotation of the rear axle, a vertically disposed geared rack bar having a pivotal end connection with said transverse frame members, a transverse shaft connected with the front end of said body and having a pinion engaging said rack bar, gearing borne by the said inclinable shaft and said transverse shaft adapted to be engaged and disengaged by the longitudinal movement of said inclinable shaft whereby the front end of the body may be raised and lowered, mechanism including a conical slide on said rear axle for moving the inclinable shaft longitudinally, and a lever operated rod for reciprocating the slide on the rear axle.

2. In a dumping vehicle, the combination with a water tight body having an upwardly and rearwardly inclined back wall, front and rear wheels, an axle for the rear wheels, said body being pivotally connected with the rear axle, frame members comprising side bars and transverse members extending between said front wheels, a longitudinally and rotatively movable inclinable shaft, gearing for rotating the shaft by the rotation of the rear axle, a vertically disposed geared rack bar having a universal end connection with the said transverse frame members, a transverse shaft connected with the front end of said body and having a pinion engaging said rack bar, gearing borne by the inclinable shaft and said transverse shaft adapted to be engaged and disengaged by the longitudinal movement of said inclinable shaft whereby the front end of the body may be raised and lowered, mechanism including a conical slide on the rear axle for moving the inclinable shaft longitudinally, and means for reciprocating said slide.

ALBERT M. HANSEN.